United States Patent

[11] 3,633,238

[72] Inventor Eric G. Parker
    Kettering, Ohio
[21] Appl. No. 79,822
[22] Filed Oct. 12, 1970
[45] Patented Jan. 11, 1972
[73] Assignee General Motors Corporation
    Detroit, Mich.

[54] WINDSHIELD WIPER APPARATUS
    4 Claims, 2 Drawing Figs.

[52] U.S. Cl................................................ 15/250.21,
    15/250.3, 74/42
[51] Int. Cl................................................ **A471 1/03,
    B60s 1/32**
[50] Field of Search.......................................... 15/250.21,
    250.17, 250.2, 250.25, 250.27, 250.3; 74/42, 23,
    57

[56] References Cited
    UNITED STATES PATENTS
1,661,388  3/1928  Sather........................ 15/250.21
2,158,254  5/1939  Rosenberg................... 15/250.27
3,422,480  1/1969  Kato............................ 15/250.3

*Primary Examiner*—Peter Feldman
*Attorneys*—W. E. Finken and W. A. Schuetz

ABSTRACT: In a preferred form, this disclosure relates to a windshield wiper apparatus for wiping a windshield of an automotive vehicle. The windshield-wiping apparatus includes a wiper having an elongated arm and a wiper blade assembly carried by the arm at its upper end and an actuating mechanism for reciprocating the wiper across the windshield between first and second positions. The actuating mechanism includes a dual cam track arrangement for guidably supporting the windshield wiper and which causes the wiper to be moved vertically while simultaneously being generally horizontally reciprocated whereby the resultant path of movement of the wiper blade assembly is linear and transversely across the windshield.

PATENTED JAN 11 1972

3,633,238

INVENTOR.
Eric G. Parker
BY
W. A. Schuetz
ATTORNEY

WINDSHIELD WIPER APPARATUS

The present invention relates to a window-wiping apparatus, and more particularly to a windshield-wiping apparatus for moving a wiper in a linear path transversely across a windshield of an automotive vehicle.

Heretofore, windshield-wiping systems for moving a windshield wiper transversely across the outer surface of a windshield have been provided. These known prior systems have included carriages which were horizontally reciprocated by rotatable screws or other drive mechanisms to move a wiper carried thereon transversely of the windshield. Known mechanisms have also included a drive means for oscillating a wiper while simultaneously moving the wiper vertically to achieve these ends. Examples of these windshield wiper systems are shown in U.S. Pat. Nos. 2,845,803 and 2,607,065.

The present invention provides a novel transverse windshield wiper system which is of an economical construction and which includes a dual cam track arrangement for guiding the movement of a windshield wiper as it is reciprocated to cause the wiper blade in engagement with the windshield to move in a linear path transversely across the windshield.

Accordingly, an important object of the present invention is to provide a new and improved window-wiping apparatus in which an actuating mechanism for reciprocating a window wiper across the outer surface of the window between first and second positions includes a dual cam or guide track arrangement which effects movement of the wiper vertically as it is being horizontally reciprocated whereby the resultant path of movement of the wiper blade is linear and transversely across the window.

Another object of the present invention is to provide a new and improved windshield wiper apparatus having a windshield wiper, an arcuate cam track disposed below the windshield, a linear cam track disposed below the arcuate cam track, a pair of cam followers or rollers which are pivotally connected to the windshield wiper and received within the arcuate and linear cam tracks and a drive means for reciprocating the wiper across the outer surface of the windshield between first and second positions during running operation, and in which the arcuate and linear guide track cause the wiper to be moved vertically as it is being generally horizontally reciprocated across the windshield so that the wiper is caused to be moved in a linear path across the outer surface of the windshield.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which.

Figure 1:
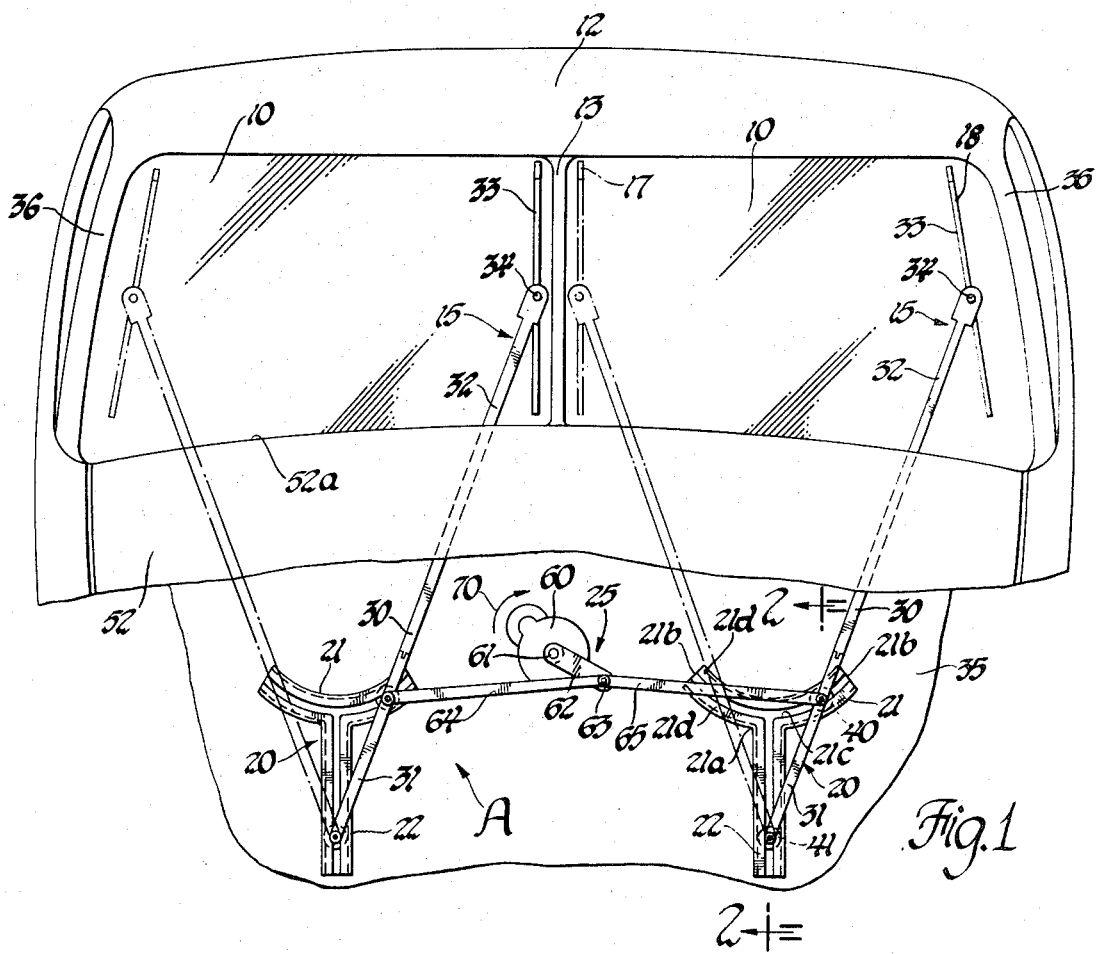
FIG. 1 is a fragmentary front elevational view of an automotive vehicle embodying the novel windshield-wiping apparatus of the present invention.

The present invention provides a novel window-wiping apparatus A for wiping a window of an automotive vehicle. Although the novel window-wiping apparatus A could be used for wiping various windows of an automotive vehicle, it is particularly useful for wiping front windshields 10 of an automotive vehicle 12 having a center post 13 for separating the front windshields 10 and in which the windshields are flat or relatively flat. Accordingly, for purposes of illustration and description it will be herein described as being used for the latter purpose.

The windshield wiping apparatus A comprises, in general, a pair of wipers 15 which are adapted to be reciprocated across the windshields 10 between first and second end positions 17 and 18 during running operation; dual cam track arrangements or guide means 20 including arcuate guide tracks 21 and linear guide tracks 22 for guiding the movement of the wipers 15 so that they move in a linear path transversely across the windshields; and a drive means 25 operatively connected with the wipers 15 for reciprocating the same between their first and second positions.

The windshield wipers 15 could be of any suitable construction and each is here shown as comprising an elongated wiper arm 30 having spring-hinged connected inner and outer sections 31 and 32 for biasing a wiper blade assembly 33 against the outer surface of the windshield 10. The wiper blade assemblies 33 are preferably pivotally connected to the upper end of the outer arm sections 32 by a pivot pin means 34 so as to be pivotally movable relative to the wiper arms about axes which extend generally normal to the plane of the windshield. The locations of the pivotal connection is such that a greater portion of the length of the wiper blade assemblies 33 is above the pivot pin means 34 than below it. The wiper blade assemblies are respectively caused to pivot relative to the wiper arms in counterclockwise and clockwise direction when moved in rightward and leftward directions across the windshield due to the frictional forces encountered by the wiper blades. The extent of this pivotal movement is limited by depending end stops (not shown) on the upper wiper arm sections 32 and the wiper blade assemblies will be disposed generally parallel to the center post 13 and end posts 36 when at the end of their strokes. This type of wiper arm to the wiper blade assembly connection is shown in U.S. Pat. No. 3,008,171 dated Nov. 14, 1961. Alternately, articulating arms having one end connected to the wiper blade assemblies 33 and their other end connected to the links 64, 65 could be employed for pivoting the wiper blade assemblies 33 relative to the wiper arms when the latter is reciprocated.

The wipers 15 are supported and guided for movement by the dual cam track arrangements 20. Since the dual cam track arrangements 20 for supporting and guiding the wipers 15 for the left and right windshields are of identical construction, only the dual cam track arrangement 20 for guiding the wiper 15 for wiping the rightmost windshield, as viewed in the drawings, will be described in detail, and corresponding parts of the other dual cam track arrangement will be given the same reference numerals.

Figure 2:
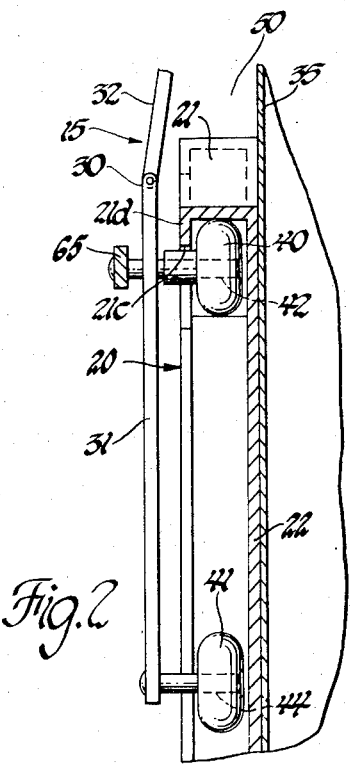
FIG. 2 is a cross-sectional view taken approximately along line 2—2 of FIG. 1.

The dual cam track arrangement 20 is supported by a panel or support 35 of the vehicle 12 and is disposed beneath the lower edge of the windshield 10. The dual cam track arrangement 20 comprises an upper or arcuate cam track 21 which is reverse C-shaped, as viewed in cross section, as shown in FIG. 2. The arcuate cam track 21 is generally U-shaped, as viewed in front elevation (see FIG. 1), and its midportion 21a is disposed further below the lower edge of the windshield 10 than its end portions 21b. The dual cam track arrangement 20 further includes a second or linear cam track 22 disposed below the arcuate cam track 21 and which extends from the midportion 21a of the arcuate cam track 21 vertically downward. The cam track 22 has a cross-sectional shape the same as that of the cam track 21.

The windshield wiper 15 is supported and guided for movement by the dual cam track 20 via first and second cam followers or rollers 40 and 41. The roller 40 is rotatably journaled on a pivot pin means or shaft 42, the shaft 42 in turn being rotatably journaled to the inner section 31 of the wiper arm 30. The roller 40 is rollably received within the cam track 21. The roller 40 has a diameter which is greater than the width of a side slot 21c of the cam track 21 through which the shaft 42 extends. The guide track 21 has a pair of inturned flanges 21d, which define the slot 21c, for retaining the roller 40 within the guide track 21. The roller 41 is pivotally or rotatably connected to the lower end of the inner section 31 of the wiper arms 30 by a pivot pin means or shaft 44. The roller 41 is rollably received within the linear guide track 22 and in the same manner that the roller 40 is received within the arcuate guide track 21.

The wipers 15 extend through a narrow slot 50 extending transversely of the vehicle 12. The slot 50 is defined by a hood or front panel 52 whose rearward edge 52a is spaced forwardly of the windshields 10.

The windshield wiper 15 is adapted to be reciprocated transversely across the outer surface of the windshield 10 between its first and second positions 17 and 18 by the drive means 25. The drive means 25 comprises a unidirectional electric motor and gear reduction unit 60 having an output shaft 61. Energization and deenergization of the motor 60 is controlled by a conventional manipulatable wiper switch (not shown). The output shaft 61 is fixed to one end of a crank arm 62. The other end of the crank arm 62 is pivotally connected via a ball and socket joint means 63 to one end of drive links 64 and 65. The other ends of the drive links 64 and 65 are respectively pivotally connected to the pivot pin means 42 of the left and right wipers 15.

When the electric motor 60 is energized the output shaft 61 is caused to be rotated in the direction of the arrow 70. Rotation of the output shaft in the direction of the arrow 70 causes the crank arm to be rotated in this direction, which in turn causes the links 64 and 65 to be reciprocated. Reciprocation of the links 64 and 65 causes the wipers 15 to be reciprocated between their first and second positions. As the wipers 15 are being moved between their positions the rollers 40 and 41 are caused to follow the contours of the cam tracks 21 and 22. This causes the wipers 15 to be moved vertically downwardly as they are being moved toward the right from their first position towards their second position until the rollers 40 reach the midpoint of the arcuate cam tracks 21 and then the wipers are caused to be moved vertically upward during the latter portion of this stroke. The simultaneous movement of the wipers 15 generally horizontally of the windshields 10 and vertically with respect to the windshields 10 causes the wiper blade assemblies 33 to traverse a path which is linear and transversely across the windshield.

The advantages of the novel windshield-wiping apparatus A is that longer wiper blades can be employed as compared to a conventional oscillatory wiper system and that virtually all of the area of the windshields can be wiped. This maximizes visibility therethrough.

When running operation is no longer desired the electric motor 60 will be deenergized. However, the motor 60 preferably includes a conventional parking switch which maintains the motor 60 energized until the wipers reach their park position, which is their rightmost or second position, as shown in FIG. 1 of the drawings. In this position the wipers 15 will be located closely adjacent the center post 13 and the rightmost end post or pillar 36, as viewed in FIG. 1, so as to be out of view.

Although the illustrated embodiment thereof has been described in great detail, it should be apparent that certain modifications, changes, and adaptations may be made in the illustrated embodiment, and that it is hereby intended to cover all such modifications, changes and adaptations which come within the spirit of the present invention.

What is claimed is:

1. A window-wiping apparatus for wiping a window of an automotive vehicle comprising: a wiper having an elongated wiper arm and a wiper blade assembly carried by the arm at its upper end; and an actuating mechanism for reciprocating the wiper across the outer surface of the window between first and second positions and with the path of movement of the wiper blade assembly being linear and transversely of the window, said actuating mechanism comprising a first cam track disposed below the window and whose midportion is spaced further below the window than its end portions and a second cam track disposed below the first cam track and extending generally vertically with respect to the window, first and second cam followers pivotally connected to said wiper arm and guidably received in said first and second cam tracks, and a drive means operatively connected to said wiper arm for moving the wiper between its first and second positions, said first and second cam followers following the contours of said first and second cam tracks to cause the wiper to be moved vertically as it is moved between its positions whereby the wiper blade assembly moves in a linear path transversely across the window.

2. A window-wiping apparatus as defined in claim 1 wherein said first cam track is arcuate and said second cam track is linear.

3. A window-wiping apparatus as defined in claim 2 wherein said first and second cam followers are rollers which are rollably received in said first and second cam tracks.

4. A windshield-wiping apparatus for wiping a pair of separated windshields of an automotive vehicle comprising: first and second spaced wipers having elongated wiper arms and wiper blade assemblies carried by the arms at their upper ends; first and second arcuately extending cam tracks disposed below the windshields and having their midportion spaced further below the windshields than their end portions; first and second linear cam tracks respectively disposed below said first and second arcuate cam tracks, said first and second linear cam tracks extending vertically downward from the midportion of said first and second arcuate cam tracks, respectively, a first roller pivotally connected to said first and second wiper arms and which are rollably received within said first and second arcuate cam tracks, respectively, a second roller pivotally connected to said first and second wiper arms at their lower end and which are respectively rollably received within said first and second linear cam tracks; and a drive means operatively connected to said wiper arms for reciprocating the wipers across the windshields between first and second positions, said first and second rollers following the contours of said first and second arcuate and linear cam tracks as said wipers are moved between their positions to cause said wipers to be moved vertically while simultaneously being reciprocated by said drive means whereby the wiper blade assemblies are caused to be moved in the linear path transversely across the windshields.

* * * * *